United States Patent
Mangano et al.

(10) Patent No.: US 9,692,672 B2
(45) Date of Patent: Jun. 27, 2017

(54) COMMUNICATION SYSTEM, AND CORRESPONDING INTEGRATED CIRCUIT AND METHOD

(71) Applicant: STMicroelectronics S.r.l., Agrate Brianza (IT)

(72) Inventors: Daniele Mangano, San Gregorio di Catania (IT); Salvatore Pisasale, Catania (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 240 days.

(21) Appl. No.: 14/604,439

(22) Filed: Jan. 23, 2015

(65) Prior Publication Data

US 2015/0207581 A1 Jul. 23, 2015

(30) Foreign Application Priority Data

Jan. 23, 2014 (IT) .............. TO2014A0047

(51) Int. Cl.
*H04L 12/26* (2006.01)
*G06F 13/42* (2006.01)
(Continued)

(52) U.S. Cl.
CPC ............ *H04L 43/0858* (2013.01); *G06F 1/04* (2013.01); *G06F 13/4291* (2013.01);
(Continued)

(58) Field of Classification Search
CPC ................................................ H04L 43/0858
See application file for complete search history.

(56) References Cited

U.S. PATENT DOCUMENTS

| 7,295,641 B1 | 11/2007 | Wortman et al. |
| 8,995,596 B1 * | 3/2015 | Loke ............ H04L 47/22 375/362 |

(Continued)

FOREIGN PATENT DOCUMENTS

| EP | 2466477 B1 | 6/2012 |
| EP | 2466478 B1 | 6/2012 |
| EP | 2466479 B1 | 6/2012 |

*Primary Examiner* — Brian D Nguyen
*Assistant Examiner* — Toan Nguyen
(74) *Attorney, Agent, or Firm* — Seed IP Law Group LLP

(57) ABSTRACT

A communication system for interfacing a transmitting circuit with a receiving circuit includes a transmission interface for receiving data from the transmitting circuit and transmitting the data received over at least one data line in response to a transmission clock signal. The communication system also includes a reception interface configured for receiving the data in response to a reception clock signal and transmitting the data received to the receiving circuit. In particular, the system is configured for generating a plurality of clock signals that have the same frequency but are phase-shifted with respect to one another. In addition, during a calibration phase, the system is configured for selecting one of the clock signals for the transmission clock signal or reception clock signal via selecting at least one of the clock signals for transmission of test signals via the transmission interface and verifying whether the test signals received via the reception interface are correct. The system is further configured to use, during normal operation, the clock signal selected during the calibration phase for transmission of data.

18 Claims, 7 Drawing Sheets

(51) Int. Cl.
*G06F 1/04* (2006.01)
*H04L 7/10* (2006.01)
*H04L 7/00* (2006.01)

(52) U.S. Cl.
CPC ............... *H04L 7/005* (2013.01); *H04L 7/10* (2013.01); *H04L 7/0008* (2013.01); *H04L 7/0037* (2013.01)

(56) References Cited

U.S. PATENT DOCUMENTS

| | | | | |
|---|---|---|---|---|
| 2001/0033188 A1* | 10/2001 | Aung | ..................... | G11C 7/22 327/141 |
| 2003/0043926 A1* | 3/2003 | Terashima | ............ | H04L 7/0012 375/257 |
| 2006/0227916 A1* | 10/2006 | Masui | ................... | H03L 7/0995 375/355 |
| 2008/0159444 A1* | 7/2008 | Terada | ................. | H04L 7/0338 375/340 |

\* cited by examiner

COMMUNICATION SYSTEM, AND CORRESPONDING INTEGRATED CIRCUIT AND METHOD

BACKGROUND

Technical Field

The present disclosure relates to communication systems and methods.

The disclosure has been developed with particular attention paid to its possible use for providing communication within integrated circuits that comprise circuits that use various clock signals (multi-clock circuits).

Description of the Related Art

Systems within an integrated circuit (Systems-on-Chip or SoCs), such as for example circuits designed for mobile or multimedia applications, frequently use various circuits of the IP (Intellectual Property) type, which are connected together to form complex systems. These systems may include systems of the multi-clock type that use multiple clock signals.

FIGS. 1a and 1b show in this context a generic system in which a transmitter component 1 transmits data over a communication channel 4 to a receiver component 6.

In the examples shown in FIGS. 1a and 1b, both of the components 1 and 6 are synchronous; namely, operation of the transmitter component 1 is synchronized with a clock signal CLK_TX, generated, for example, via a first oscillator 2, and operation of the receiver component 6 is synchronized with a clock signal CLK_RX, generated, for example, via a second oscillator 7.

Consequently, for transmitting the data generated by the component 1 to the component 6 interface systems 3 and 5 are necessary and configured for transmitting the data over the communication channel 4 taking into account the fact that the clock signals CLK_TX and CLK_RX may be phase-shifted with respect to one another or may even be different.

The person skilled in the art will appreciate that for the above purpose typically a dual-port First-In First-Out (FIFO) memory is used, where generally writing occurs with the clock signal CLK_TX of the transmitting circuit 1 and reading occurs with the clock signal CLK_RX of the receiving circuit 6.

For instance, in FIG. 1a the FIFO memory forms part of the reception interface 5 of the receiving circuit 6, whereas in FIG. 1b the FIFO memory is incorporated in the transmission interface 3 of the transmitting circuit 1.

In this context, FIG. 1c is a schematic illustration of a possible synchronous-communication scheme based upon a two-phase signaling protocol, i.e., communication is synchronized with a clock signal CLOCK, for example with the rising edge of the signal CLOCK.

In this case, it is possible to use a first control signal REQ for signaling that data are available on a bus DATA, i.e., that the data are valid, and a second control signal ACK for signaling that the receiver has been able to sample the data DATA.

In particular, in order to indicate the fact that no new data are available on the bus DATA, the signal REQ has a first logic value, such as for example the logic level '0'; namely, this condition corresponds to an initial step, referred to as RESET. Instead, when new data are available on the bus DATA (step FS1), the transmitter component changes at an instant $t_1$ the logic value of the signal REQ; for example, it changes the logic level of the signal REQ from '0' to '1'.

However, on account of propagation delays, this change is not immediately detectable, and the receiver can detect said change of the signal REQ only with the next rising edge of the signal CLOCK, i.e., at an instant $t_2$.

Once the change of the signal REQ (step FA2) has been detected, the receiver component samples the data on the bus DATA and confirms that the data have been read; namely, the receiver component changes at the instant $t_2$ the logic value of the signal ACK; for example, it changes the logic level of the signal ACK from '0' to '1'.

Again, this change can only be detected at the next clock cycle, i.e., at an instant $t_3$.

Consequently, when the transmitter component detects the change of the logic value of the signal ACK at the instant $t_3$, transmission has gone through successfully and both of the components return to the initial condition, i.e., the condition RESET. However, in the case where a number of data must be transferred consecutively at the maximum speed, the signals REQ and ACK could even remain always high.

The above communication is synchronous, because, in order to generate and sample the control signals REQ and ACK, both of the components use one and the same clock signal, or else clock signals that have one and the same frequency.

Consequently, applying a similar synchronous protocol to FIGS. 1a and 1b:
- the data can be written in the FIFO memory with the clock signal CLK_TX, where a signal TX_REQ indicates a request for writing of data TX_DATA in the FIFO memory, and a signal TX_ACK indicates that the data TX_DATA have been written in the FIFO memory; and
- the data can be read from the FIFO memory with the clock signal CLK_RX, where a signal RX_REQ indicates that data RX_DATA are available in the FIFO memory, and a signal RX_ACK indicates that the data have been read by the receiving circuit 6.

However, in both cases it is necessary for the clock signals CLK_TX and CLK_RX to be brought up to the FIFO memory. Consequently, in the case where the circuits are far apart, one of the clock signals (signal CLK_TX in FIG. 1a and signal CLK_RX in FIG. 1b) is also subject to a long delay, which should be taken into account.

For this reason, as an alternative to a synchronous communication protocol, also an asynchronous communication protocol could be used.

For instance, FIG. 2a shows an example in which the interface 3 is configured for converting the synchronous communication generated by the transmitter circuit 1 into an asynchronous communication, and the interface 5 is configured for converting the asynchronous communication received from the interface system 3 once again into a synchronous communication.

Typically, asynchronous circuits are based upon a signaling protocol comprising four handshaking phases. In this case, the insensitivity to the delay is obtained via a particular encoding of the data; i.e., the validity of the data may be recognized also from the data themselves.

For instance, FIG. 2b shows a communication scheme based upon a four-phase signaling protocol, where the signal on a bus ADATA itself signals start of a new communication. In this case, a signal AACK for signaling that the receiver component has been able to sample the data is in any case expedient.

In particular, also in this case, both the transmitter component and the receiver component are in an initial condition referred to as RESET.

However, in order to signal start and end of a communication, the signal on the bus ADATA is directly used. For instance, typical four-phase protocols are the "Dual-Rail" or "1-of-N" protocols.

For example, in order to transmit the logic value '0' (step FA1), it is possible to transmit in actual fact at an instant $t_4$ the sequence of bits "01" on two different lines. In a substantially similar way, in order to transmit the logic value '1', it is possible to transmit in actual fact the sequence of bits "10".

The receiver component detects said signal on the bus ADATA and confirms that they have been read (step FA2); i.e., it changes the logic value of the signal AACK, for example, changing the logic level from '0' to '1'.

Consequently, the transmitter component detects the change of the signal AACK at an instant $t_5$, and the transmitter component signals the end of the communication at an instant $t_6$ (step FA3). For instance, in order to signal the end of the communication, the transmitter component can transmit the sequence of bits "00".

Finally, said sequence of bits is detected by the receiver component, and also this returns to the initial condition, i.e., the receiver component again changes the logic value of the signal AACK.

The transmitter component can detect this change at an instant $t_7$ and terminate the communication (step FA4).

Hence, such a four-phase protocol can also be detected in an asynchronous way, i.e., at any moment.

For instance, the documents Nos. EP 2 466 477, EP 2 466 478 and EP 2 466 479, the contents of which are incorporated herein for reference, describe possible embodiments of the interfaces 3 and 5 that can be used for such an asynchronous communication.

The above asynchronous-communication systems hence solve the problem of the delays in propagation of the various clock signals. However, as mentioned previously, typically additional wires are required for implementing the asynchronous encoding, and, owing to the four-phase protocol, communication is typically slower.

BRIEF SUMMARY

Embodiments of the present disclosure overcome one or more of the disadvantages outlined above.

With a view to achieving the aforesaid embodiments, the subject of the disclosure is a communication system presenting the characteristics specified in claim 1. The disclosure also regards a corresponding integrated circuit and a corresponding method. Further advantageous characteristics of the disclosure form the subject of the dependent claims.

The claims form an integral part of the technical teaching provided herein in relation to the embodiments.

Various embodiments described herein refer to solutions that enable interfacing of a first circuit with a second circuit.

In various embodiments, a transmission interface receives data from the transmitting circuit and transmits the data over at least one data line in a synchronous way, i.e., in response to a first clock signal. A reception interface receives the data in a synchronous way, i.e., in response to a second clock signal, and transmits the data received to the receiving circuit.

In various embodiments, during normal operation, the transmission of data by the transmission interface and the reception of data by the reception interface, i.e., reading of data on the data lines, occur with two clock signals that have one and the same frequency, but that may be phase-shifted with respect to one another, for example following upon propagation delays.

For instance, in various embodiments, the transmission interface transmits the data in response to a transmission clock signal. In this case, the reception interface may comprise a first-in first-out memory, and data are written in the first-in first-out memory in response to a clock signal that is derived from the transmission clock signal. Instead, in other embodiments, the reception interface receives the data in response to a reception clock signal. In this case, the transmission interface may comprise a first-in first-out memory, and data are read from the first-in first-out memory in response to a clock signal that is derived from the reception clock signal.

In various embodiments, in order to enable a correct transmission of the data, a calibration phase of the transmission clock signal and/or reception clock signal is envisaged.

For instance, in various embodiments, a plurality of clock signals are generated, where the clock signals have one and the same frequency but are phase-shifted with respect to one another, and during the calibration phase at least one of these clock signals is selected and at least one test signal is transmitted. Consequently, by verifying that the test signal has been received correctly by means of the reception interface, it is possible to select a clock signal that is to be used during normal operation during the transmission of the data, i.e., for the transmission clock signal or reception clock signal.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified.

Embodiments will now be described purely by way of non-limiting example with reference to the annexed drawings, wherein.

DETAILED DESCRIPTION

In the ensuing description various specific details are illustrated aimed at providing an in-depth understanding of the embodiments. The embodiments may be provided without one or more of the specific details, or with other methods, components, materials, etc. In other cases, known structures, materials, or operations are not shown or described in detail so that various aspects of the embodiments will not be obscured.

Reference to "an embodiment" or "one embodiment" in the framework of this description is intended to indicate that a particular configuration, structure, or characteristic described in relation to the embodiment is comprised in at least one embodiment. Hence, phrases such as "in an embodiment" or "in one embodiment" that may be present in various points of this description do not necessarily refer to one and the same embodiment. Furthermore, particular conformations, structures, or characteristics may be combined in any adequate way in one or more embodiments.

The references used herein are only provided for convenience and hence do not define the sphere of protection or the scope of the embodiments.

As mentioned previously, the purpose of the disclosure is to provide a communication system for transmitting data from a transmitter circuit 11 to a receiver circuit 16 over a communication channel 14.

Figure 1A:
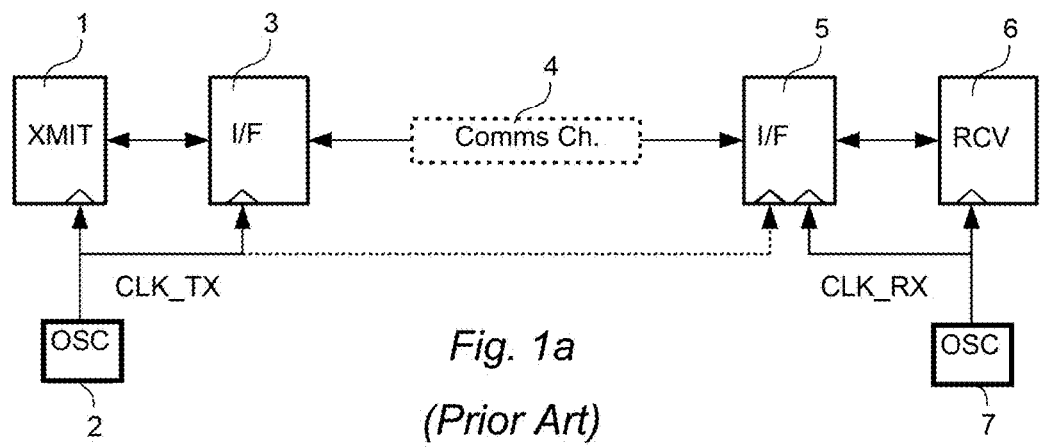
FIGS. 1a to 2b have already been described previously.
Figure 1B:
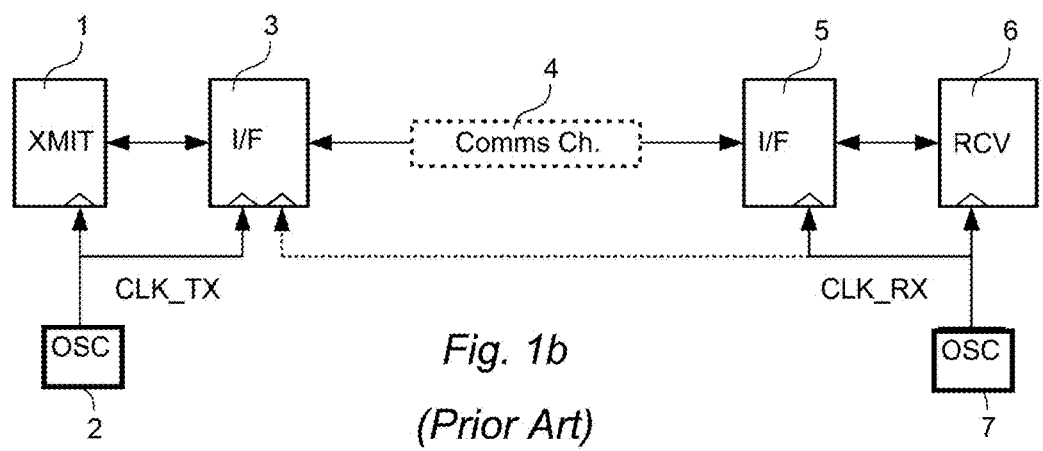

Substantially, the communication system is based upon a synchronous communication protocol, as shown for example in FIGS. 1a and 1b. However, according to the present description, mechanisms are provided that enable automatic calibration of the clock signal in such a way as to ensure proper data reception.

Figure 3:
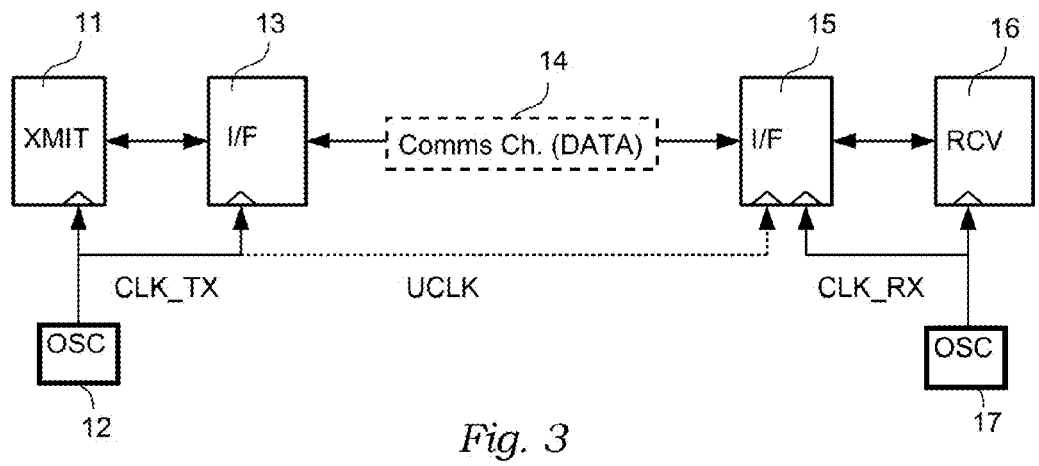
FIG. 3 is a block diagram that shows a possible embodiment of a communication system according to the present description.

FIG. 3 shows a first embodiment that is essentially based upon the block diagram of FIG. 1a.

In the embodiment considered, a transmitting circuit 11 generates data, and a communication interface 13 sends these data over a communication channel 14 using a synchronous communication protocol. Consequently, in general, the transmission interface 13 is connected to the reception interface 15 over at least one data line DATA.

Figure 1C:
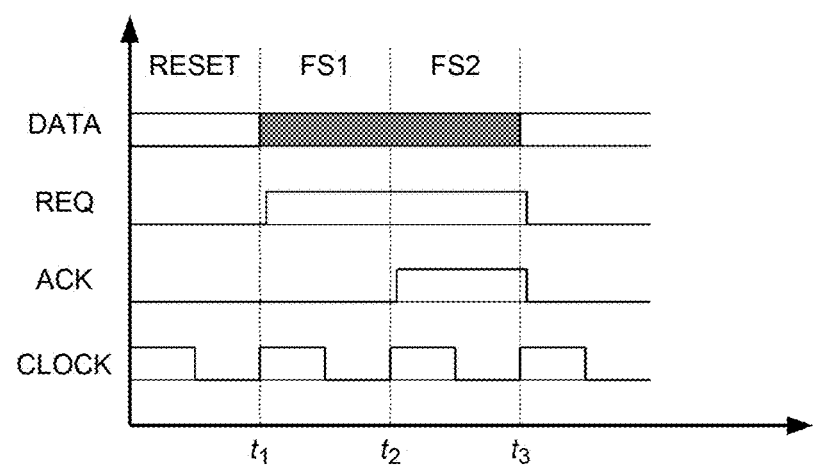
Figure 2A:
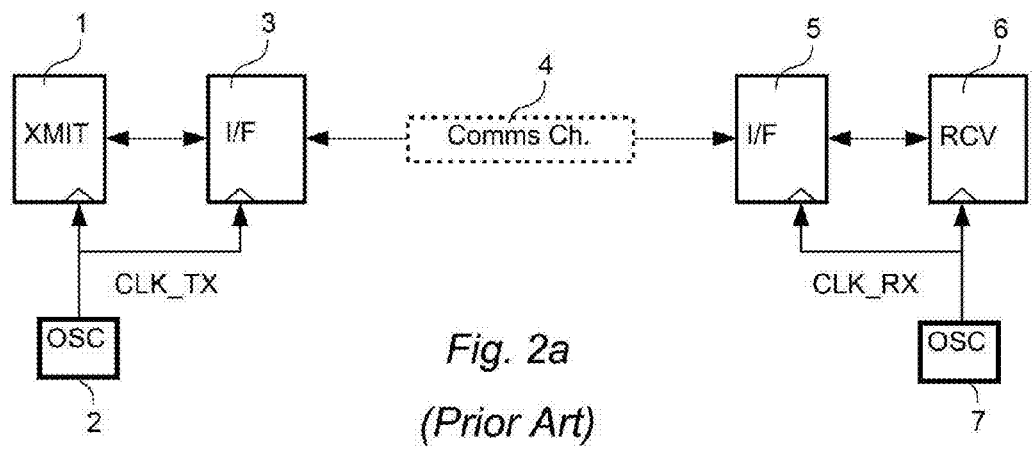
Figure 2B:
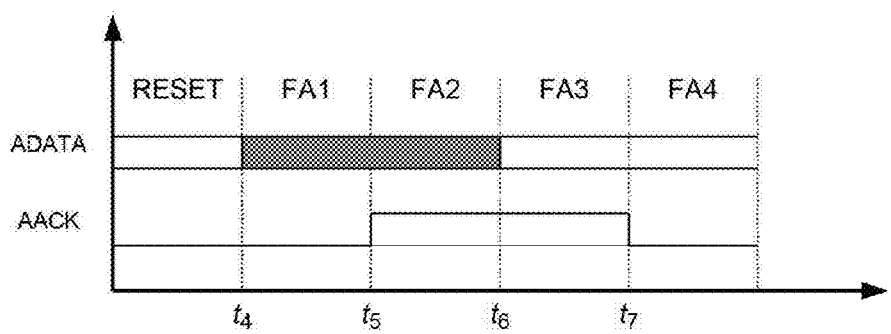

In general, the communication protocol is not required to be a flow-control protocol as shown in FIG. 1c. However, in general there may also be envisaged a signal REQ that indicates whether the data on the data line DATA are valid and/or a signal ACK that indicates that the data have been received.

For instance, in various embodiments, the circuit 11 could merely be a sensor, and the communication interface 13 could send at each rising (or falling) edge the datum sampled; namely, the communication channel 14 could simply consist of the data lines DATA.

Instead, in various embodiments, the transmitting circuit 11 could also be a digital circuit. In this case, the interface 13 could be implemented, for example, with a buffer or also with a FIFO memory.

Consequently, in general, the communication interface 13 sends the data according to a communication protocol that is synchronized with a transmission clock signal CLK_TX.

The above clock signal CLK_TX is also brought to the communication interface 15 as clock signal UCLK. Consequently, in general, the clock signal UCLK has the same frequency as the transmission clock signal CLK_TX, but could be phase-shifted with respect to the signal CLK_TX. Consequently, in general, the clock signal UCLK may also be phase-shifted with respect to the data signal DATA.

However, in order to sample the data, for example store them in a register or some other type of memory, it would be necessary to respect the setup and hold times of the memory, where the setup time typically indicates the minimum time during which the data signal DATA must remain stable before it can be stored and the hold time typically indicates the minimum time during which the data signal must remain stable after sampling.

Figure 4:
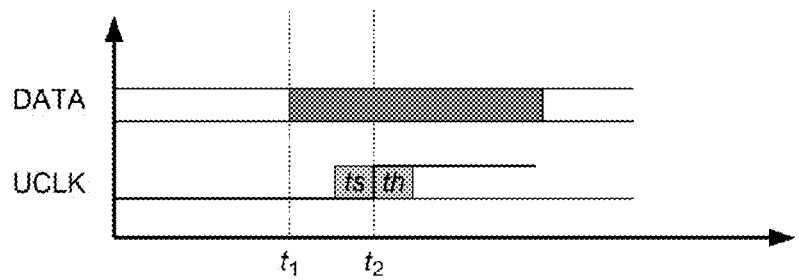
FIG. 4 illustrates an example of sampling of a data signal.

In particular, as shown in FIG. 4, at an instant t1 the data signal DATA is stable at input to the interface 15. Next, a rising (or falling) edge of the clock signal UCLK arrives at an instant t2, which drives reading of the data signal DATA. In this case, there exists a forbidden interval before and after the instant t2, which is specified, respectively, via the setup time ts and hold time th, where the data signal DATA should not change to prevent false reading of the data.

However, as explained previously, on account of propagation delays and also on account of the delays of the logic circuits that change the signal on the data line DATA, the instant t1 may even fall precisely in the forbidden interval between t2−ts and t2+th, which could cause malfunctioning of the entire system.

Consequently, in various embodiments, the communication system is configured for generating different versions (UCLK1, UCLK2, . . . ) of the clock signal UCLK that are phase-shifted with respect to one another.

Figure 5A:
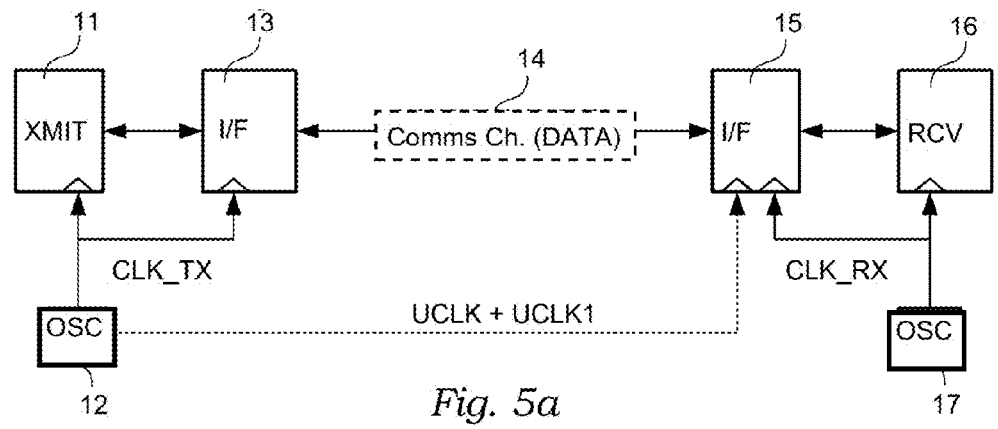
FIGS. 5a, 5b and 5c are block diagrams that show possible embodiments of communication systems in which a plurality of clock signals is generated.
Figure 5B:
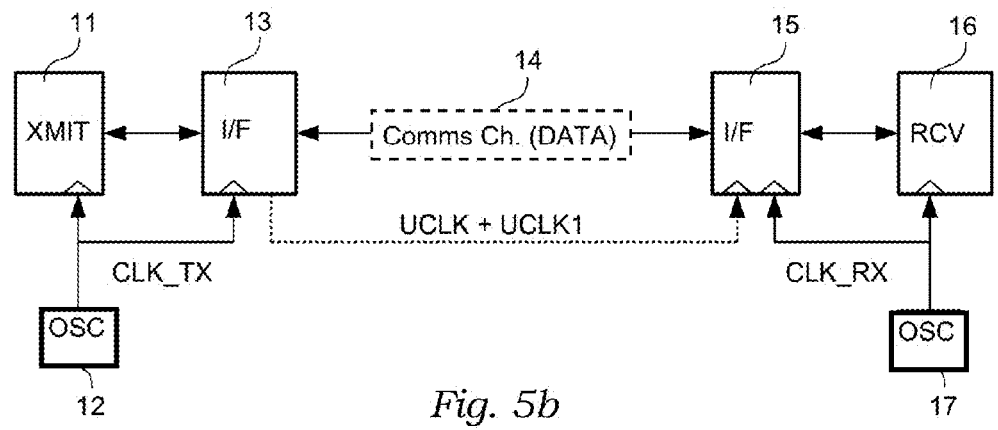
Figure 5C:
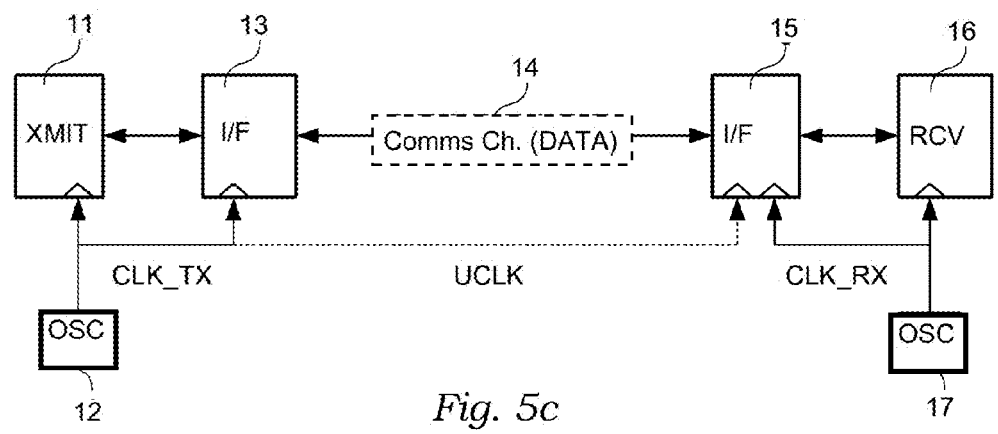

For instance, FIGS. 5a, 5b, and 5c show different possible embodiments for generation of the above clock signals UCLK1, UCLK2, . . . . In particular, in the embodiment shown in FIG. 5a, at least one additional clock signal UCLK1 is supplied directly by the oscillator 12. Instead, in FIG. 5b, the communication interface 13 receives the clock signal from the oscillator 12 and generates at least one additional clock signal UCLK1. Finally, in FIG. 5c, the communication interface 15 receives the clock signal UCLK and generates at least one additional clock signal UCLK1 (not shown). In particular, the latter embodiment is advantageous because just a single wire is necessary for bringing the clock signal UCLK to the interface 15. In this way, the phase shift between the clock signal UCLK and the additional clock signals UCLK1, UCLK2, . . . is also independent of various propagation delays that may be caused, for example, by different lengths of the paths within the integrated circuit. However, if a plurality of reception interfaces 15 is envisaged, each interface 15 should comprise a circuit that creates the additional clock signals. Consequently, the choice of the architecture depends upon the specific application.

Figure 6:
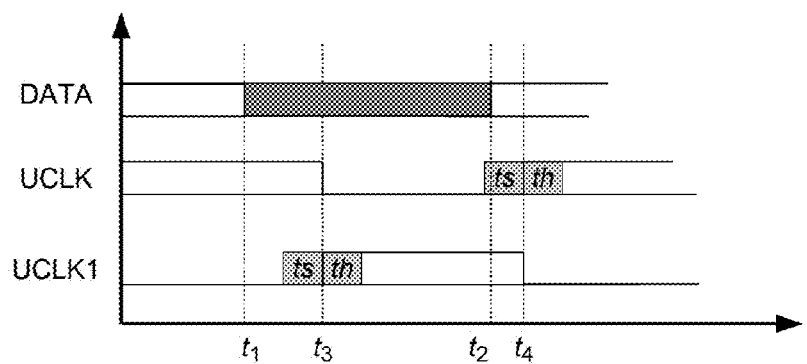
FIG. 6 illustrates an embodiment of sampling of a data signal according to the present disclosure.

FIG. 6 shows an embodiment in which just one additional clock signal UCLK1 is generated that preferably corresponds to the clock signal UCLK inverted, i.e., the clock signals UCLK and UCLK1 are phase-shifted by 180°.

In particular, FIG. 6 illustrates an example in which the data signal on the data line DATA is valid for a given time between an instant t1 and an instant t2. However, when the rising edge of the clock signal UCLK arrives, at an instant t4 (assuming sampling at the rising edge), the data signal DATA is no longer valid and/or does not remain stable in the interval that is defined by the setup time ts and the hold time th. Consequently, a sampling in response to the clock signal UCLK could create malfunctioning of the circuit. Hence, in the embodiment considered, the clock signal UCLK1 is used for sampling, i.e., the data signal DATA is read in response to the phase-shifted clock signal UCLK1, and the original clock signal UCLK is not used. In fact, when the rising edge of the signal UCLK1 arrives, at an instant t3, the data signal DATA is valid. Consequently, in the case where the data signal DATA is valid at least for a period that corresponds to $T/2-(ts+di)$, where T is the period of the clock signal UCLK, a correct sampling is always possible irrespective of the phase shift between the data signal and the clock signal UCLK.

Consequently, in various embodiments, the transmission interface 13 sends data on a data line DATA according to a synchronous communication protocol, i.e., in response to a clock signal CLK_TX. Next, the reception interface stores the data in a FIFO memory. In particular, the reception interface is driven via a clock signal that corresponds to the transmission clock signal CLK_TX (i.e., its delayed version UCLK), or one or more additional clock signals UCLK1, UCLK2, . . . that have the same frequency but are phase-shifted with respect to one another. Instead, thanks to the use of a dual-port FIFO memory, the data may be read from the FIFO memory with a clock signal RX_CLK that may even be independent of the transmission clock signal CLK_TX.

In one embodiment, selection between the clock signal UCLK and the additional clock signals UCLK1, UCLK2, . . . is made directly by the reception interface 15 via a self-calibration procedure.

Figure 7:
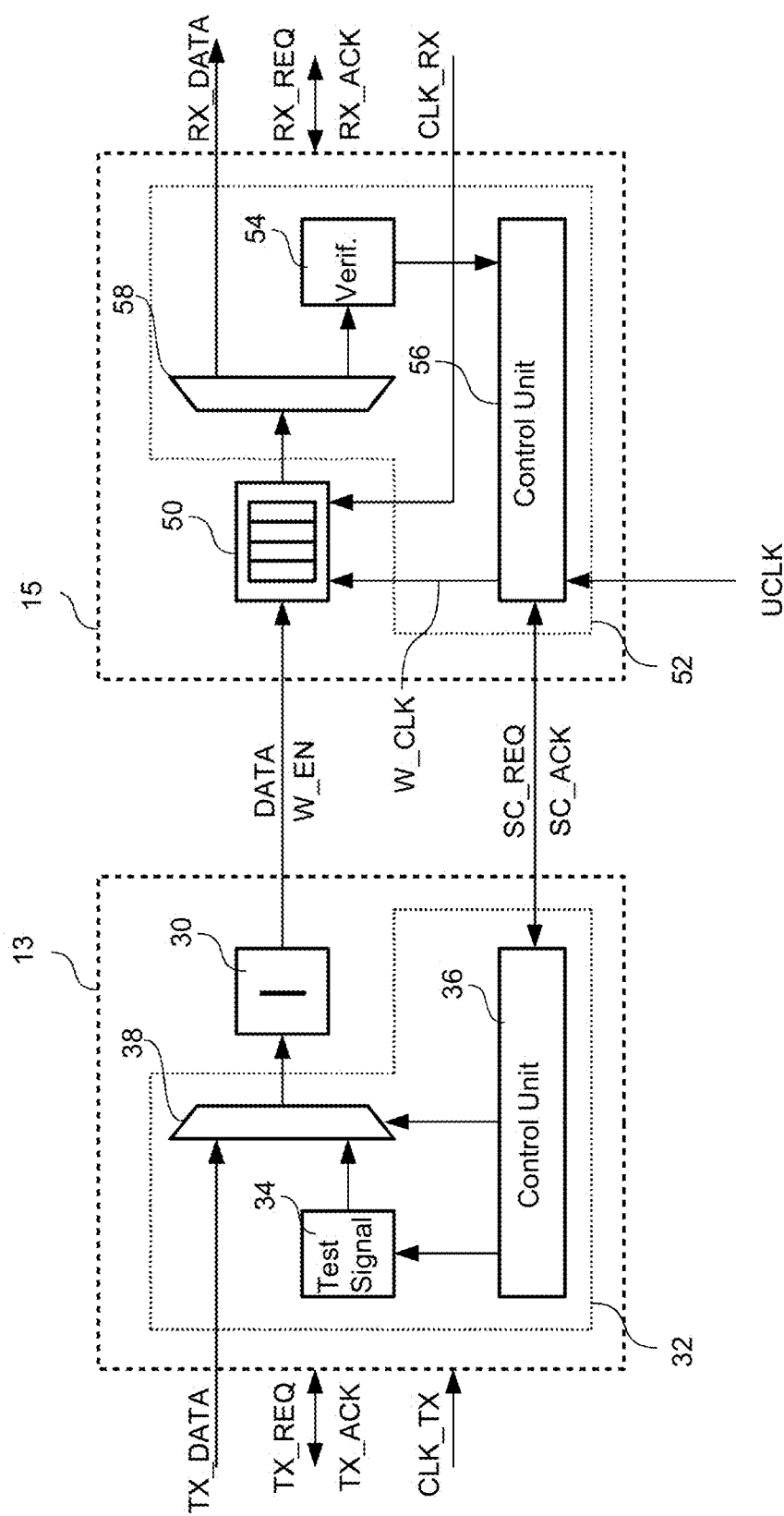
FIG. 7 is a block diagram of an embodiment of a communication system, which enables calibration of a clock signal.

For instance, FIG. 7 shows a possible embodiment of the entire communication system.

In the embodiment considered, the transmission interface receives from a transmitting circuit 11 data TX_DATA. Next, the transmission interface 13 stores said data in a buffer 30, such as for example a FIFO memory or a simple register. The person skilled in the art will appreciate that the transmission interface 13 could process the data TX_DATA before their transmission. For instance, the transmission interface 13 could create physical units that have a reduced dimension, encode the data, and/or form data packets. Finally, the transmission interface sends the data that are stored in the buffer 30 through a plurality of data lines DATA to the reception interface 15.

In the embodiment considered, the reception interface 15 comprises a FIFO memory 50 in which the data that have been received from the data lines DATA are stored. Finally, the data are read from the FIFO memory 50 and sent to the receiving circuit 16 as data RX_DATA. Also in this case, the reception interface 15 can process the data to recover the original data.

In particular, in the embodiment considered, the data are written in the FIFO memory 50 with a clock signal W_CLK that is derived from the transmission clock signal CLK_TX, i.e., its delayed version UCLK, and the data are read from the FIFO memory via the clock signal CLK_RX of the receiving circuit 16. In particular, the clock signal W_CLK has the same frequency as the transmission clock signal CLK_TX, but may be phase-shifted in such a way as to enable correct writing of the data on the data line DATA in the FIFO memory 50. For instance, in the embodiment shown in FIG. 6, the signal W_CLK is generated directly in the reception interface 15 as a function of the clock signal CLK_TX, i.e., its delayed version UCLK.

In general, the communications between the various circuits may also use control signals. In particular, this applies to the communications between:

a) the transmitting circuit 11 and the transmission interface 13, i.e., the buffer 30;

b) the transmission interface 13 and the reception interface 15, i.e., between the buffer 30 and the FIFO memory 50; and/or c) the reception interface 15, i.e., the FIFO memory 50, and the receiving circuit 16.

For instance, the communications between the transmitting circuit 11 and the transmission interface 13 and/or the reception interface 15 and the receiving circuit 15 may use flow control signals, for example the signals TX_REQ/TX_ACK and RX_REQ/RX_ACK, which have been described with reference to FIG. 1c. Instead, the communication between the transmission interface 13 and the reception interface 15 could use just one signal W_EN, which activates writing of data in the FIFO memory 50, i.e., said signal corresponds only to the use of a signal REQ that indicates that the data on the data line DATA are valid. Consequently, in this case, the writing pointer of the FIFO memory 50 could be incremented only when the signal W_EN is activated.

For instance, said control signals can be used to inhibit transmission of new data by the transmitting circuit 11 when the FIFO memory 50 is full and/or for signaling the fact that the FIFO memory 50 contains data. Furthermore, also the state of the FIFO memory 50, for example the state of filling of the FIFO memory 50, could be signaled directly to the transmission interface 13, where the state signal is preferably synchronized in a way in itself known via a chain of registers that are driven via the clock signal CLK_TX.

As mentioned previously, the clock signal W_CLK for writing data in the FIFO memory 50 has the same frequency as the transmission clock signal CLK_TX, but may be phase-shifted.

In the embodiment considered, the clock signal W_CLK, i.e., the phase shift with respect to the transmission clock signal CLK_TX, may be calibrated automatically and directly at the level of the integrated circuit.

For instance, in one embodiment, the above calibration is carried out automatically when the circuit is switched on. In general, the calibration could be carried out also periodically and/or upon request from one of the components of the system, for example the main processor of the system. Furthermore, the result could be stored also in a nonvolatile memory, such as for example a fuse, in such a way that the calibration does not have to be carried out again when the circuit has been switched off.

In one embodiment, to carry out calibration, the transmission interface 13 and the reception interface 15 comprise a control circuit 32 and a control circuit 52, respectively, which co-operate for setting the clock signal W_CLK.

In particular, in the embodiment considered, the control circuit 32 comprises a circuit 34 configured for generating a test signal, and the control circuit 52 comprises a circuit 54 configured for verifying the data received.

In this way, when the calibration mode is activated, the control circuit 32 sends, instead of the normal data TX_DATA, the test signal that is generated via the circuit 34. In general, this test signal may consist of a single transmission or preferably a sequence of signals in such a way as to generate various switchings on the data line DATA that are representative for real transmissions of data. Instead, the reception interface, i.e., the verification circuit 54, verifies whether the data received are correct. For instance, in the embodiment considered, the verification circuit 54 reads for this purpose the data that have been transmitted from the FIFO memory 50.

Consequently, in the case where the data received are correct, the current clock signal W_CLK is appropriate for transmission of the data; otherwise, another clock signal is selected, i.e., a clock signal with a different phase shift, and the calibration procedure is repeated.

For instance, in the embodiment considered, the control circuit 32 and the control circuit 52 comprise, respectively, a control unit 36 and a control unit 56 that control the calibration phase.

In particular, in the embodiment considered, the control unit selects a clock signal W_CLK, which for example initially corresponds to the clock signal UCLK that has been received from the transmission interface 13. Next, the control unit 56 sends to the unit 36 a control signal SC_REQ, which indicates the fact that the calibration phase has been activated. Preferably, said control signal SC_REQ is synchronized via a chain of registers that are driven via the clock signal CLK_TX. The control unit 36 may confirm reception of the signal SC_REQ via a control signal SC_ACK. Preferably, also this control signal SC_ACK is synchronized via a chain of registers that this time are driven via the clock signal CLK_RX.

In the embodiment considered, the control unit 36 then activates the circuit 34 that generates the test signals that are transmitted on the data lines DATA. For instance, a multiplexer 38 can be used for this purpose, which makes it possible to select whether the data received from the transmitting circuit TX_DATA (normal operation) or the data generated by the circuit 34 (calibration operation) are to be transmitted.

In the embodiment considered, the data on the data line DATA are then saved in the FIFO memory 50 in response to the signal W_CLK. In particular, as shown with reference to FIGS. 4 and 6, in general this writing may be right or wrong. Next, the data that have been saved in the FIFO memory 50 are read and verified via the circuit 54, which notifies the result of the verification to the control unit 56. For instance, for this purpose a de-multiplexer 58 may be used that makes it possible to select whether the data stored in the FIFO memory 50 can be read by the receiving circuit 16 (normal operation) or by the verification circuit 54 (calibration operation).

Consequently, in the case where the data received are correct, the control unit 56 disables the calibration phase. Otherwise, the control unit generates and/or selects a clock signal with a different phase shift, and calibration is repeated.

Figure 8:
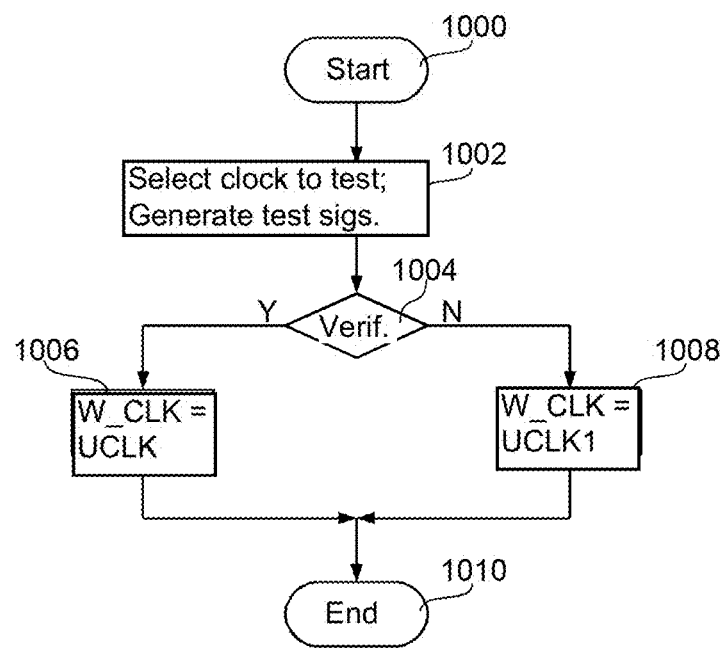
FIG. 8 is a flowchart of a first method that enables calibration of a clock signal.

For instance, FIG. 8 shows a simplified embodiment in which the control circuit 52 can select only between the clock signal UCLK or its inverted version UCLK1 (see, for example, FIG. 6).

In a starting step 1000, the calibration procedure is activated.

Next, the control circuit 52 selects the clock signal UCLK and activates, in a step 1002, generation of the test signals via the control circuit 32.

In a verification step 1004, the control circuit 52 verifies whether the data received are correct.

In the case where the data received are correct (output "Y" from the verification step 1004), the control circuit selects, in a step 1006, the clock signal UCLK as signal W_CLK for writing data in the FIFO memory during normal operation, and the calibration procedure terminates in a step 1010, i.e., the reception interface 15 returns to the normal operating mode.

Instead, in the case where the data received contain errors (output "N" from the verification step 1004), the control circuit selects, in a step 1008, the inverted clock signal UCLK1 as signal W_CLK for writing data in the FIFO memory during normal operation, and the calibration procedure terminates in step 1010.

In one embodiment, the control circuit 52 can verify in any case transmission of the test signals both for the signal UCLK and for the inverted clock signal UCLK1. In fact, under certain operating conditions, a test signal could be received correctly even though the safety times are not satisfied in every operating condition of the system. Consequently, in one embodiment, the control circuit 52 determines whether for one of the signals UCLK and UCLK1 errors of transmission are present and selects the opposite clock signal, which should hence be a safer.

As mentioned previously, during the calibration phase, the control circuit 32 of the transmission interface 13 is configured for generating given test signals that are known to the control circuit 52 of the reception interface 15.

In general, it is preferable for a plurality of transmissions to be carried out in such a way as to verify different propagations on the data line. Typically, two consecutive transmissions that generate the minimum propagation delay and two transmissions that have the maximum propagation delay should be generated. However, frequently these signals can be determined only when the hardware implementation of the logic circuits and the propagation delays of the circuits and of the paths are known.

However, considering the fact that typically the output of the buffer 30 is directly connected to the input of the FIFO memory 50, intermediate logic circuits that may introduce delays are not present, but the propagation delay is determined prevalently by the propagation delays and by the delays introduced directly by the buffer 30 and by the FIFO memory 50, for example by a typical de-multiplexer at the input of the FIFO memory 50.

As a result, approximately, transmission of the data can be verified by transmitting on each data line during a first clock cycle the logic value "0" and during the next clock cycle the logic value "1". In a similar way, it would also be necessary to verify transmission of the logic value "0" followed by the logic value "1".

Consequently, in various embodiments, on each data line DATA during the calibration phase a sequence of logic values of the type "0101" or "1010" is transmitted. In general, these profiles may also vary between the different data lines. For instance, on a first data line the profile "0101" could be transmitted, and on a second data line the profile "1010" could be transmitted.

For instance, in a currently preferred embodiment, the profile "0101" is transmitted during a first calibration phase on all the data lines DATA, for example until the receiving FIFO memory 50 is full. Next, if all the data have been received correctly, the profile "1010" is transmitted during a second calibration phase, for example until the receiving FIFO memory 50 is full. Consequently, in this way correct reception of data in each memory cell of the FIFO memory 50 can be verified, and in the case where one of the tests is not positive, the control circuit 52 selects a different clock signal.

As mentioned previously, in certain conditions the reception interface could be able to receive the data even though the clock signal is not optimal. For instance the setup time ts and the hold time th, and also the propagation delays, may vary with the temperature of the system.

Figure 9:
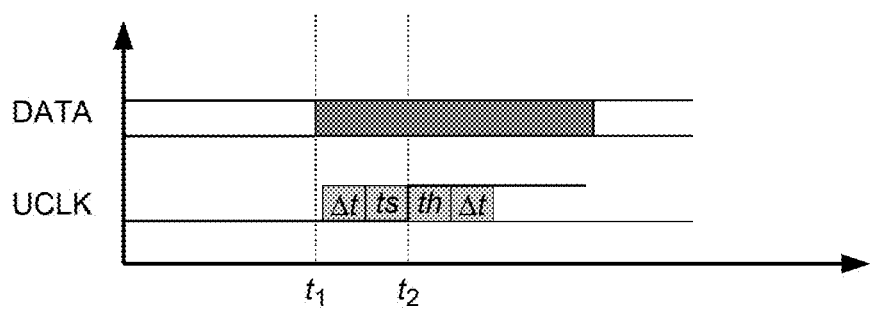
FIG. 9 illustrates a further embodiment of sampling of a data signal according to the present disclosure.

For instance, as shown in FIG. 9, in general the safety area should be extended by a time $\Delta t$ before the setup time ts and after the hold time th.

Consequently, in one embodiment the system generates two additional phase-shifted clock signals UCLK2 and UCLK3.

In particular, in one embodiment, these clock signals UCLK2 and UCLK3 are phase-shifted by $-\Delta t$ and $+\Delta t$ with respect to the clock signal UCLK.

Figure 10:
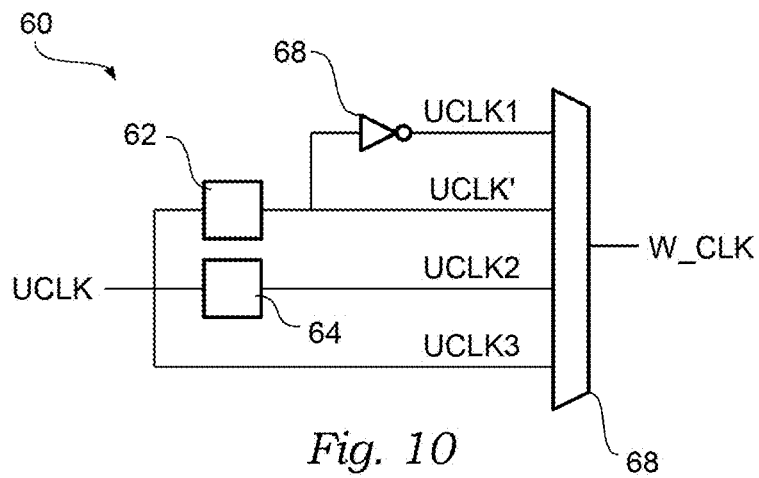
FIG. 10 is a block diagram of a circuit that enables generation of a plurality of clock signals.

For instance, FIG. 10 shows a possible embodiment of a circuit 60 that is configured for generating four clock signals in such a way that:

the signal UCLK' corresponds to the clock signal UCLK delayed by $\Delta t$, for example via a delay line 62, i.e., $UCLK'=UCLK+\Delta t;$ the signal UCLK1 corresponds to the clock signal inverted UCLK', for example through an inverter 64, i.e., $UCLK1=\overline{UCLK'};$ the signal UCLK2 corresponds to the clock signal UCLK' delayed by $\Delta t$, for example via a delay line 64, i.e., $UCLK2=UCLK'+\Delta t=UCLK+2\Delta t;$ and the signal UCLK3 corresponds to the clock signal UCLK, i.e., $UCLK3=UCLK=UCLK'-\Delta t.$ Consequently, in the embodiment considered, the control circuit 52 can select, for example by means of a multiplexer 68, from among the clock signals UCLK', $\overline{UCLK'}$, UCLK'+$\Delta t$, and UCLK'−$\Delta t$.

In what follows a possible embodiment of a method will now be described that makes it possible to select the clock signal W_CLK from among the above clock signals.

In particular, in the embodiment considered, during normal operation, the clock signal W_CLK corresponds only to UCLK' or $\overline{UCLK'}$, and the other clock signals are used only during the calibration phase.

In a starting step 2000 the calibration procedure is activated.

Next, the control circuit 52 selects the clock signal UCLK' and activates, in a step 2002, generation of the test signals via the control circuit 32.

In a verification step 2004, the control circuit 52 verifies whether the data received are correct.

In the case where the data received contain errors (output "N" from the verification step 2004), the control circuit selects, in a step 2006, the inverted clock signal UCLK1 as clock signal W_CLK for writing data in the FIFO memory during normal operation, and the calibration procedure terminates in step 2018.

Instead, in the case where the data received are correct (output "Y" from the verification step 2004), the control circuit selects the clock signal UCLK2 and again activates, in a step 2008, generation of the test signals via the control circuit 32.

In a verification step 2010, the control circuit 52 verifies whether the data received are correct.

In the case where the data received contain errors (output "N" from the verification step 2010), the control circuit selects, in step 2006, the inverted clock signal UCLK1 as clock signal W_CLK for writing data in the FIFO memory during normal operation, and the calibration procedure terminates in step 2018.

Instead, in the case where the data received are correct (output "Y" from the verification step 2004), the control circuit selects the clock signal UCLK3 and again activates, in a step 2012, generation of the test signals via the control circuit 32.

In a verification step 2014, the control circuit 52 verifies whether the data received are correct.

In the case where the data received contain errors (output "N" from the verification step 2014), the control circuit selects in step 2006 the inverted clock signal UCLK1 as clock signal W_CLK for writing data in the FIFO memory during normal operation, and the calibration procedure terminates in step 2018.

Instead, in the case where the data received are correct (output "Y" from the verification step 2004), the control circuit 52 selects, in a step 2016, the clock signal UCLK' as clock signal W_CLK for writing data in the FIFO memory during normal operation, and the calibration procedure terminates in step 2018.

Consequently, in the embodiment considered, the clock signal UCLK' is selected only if no reading errors are present for the clock signals UCLK', UCLK'+$\Delta t$ and UCLK'−$\Delta t$.

The person skilled in the art will appreciate that the solutions described herein present numerous advantages, such as for example:

the transmission clock signal CLK_TX that is brought from the transmission interface 13 to the reception interface 14 may also present propagation delays that are different from those of the data lines DATA; and the clock signal W_CLK that is used for writing the data in the FIFO memory 50 can be determined automatically at the silicon level, i.e. in the final product.

Figure 11:
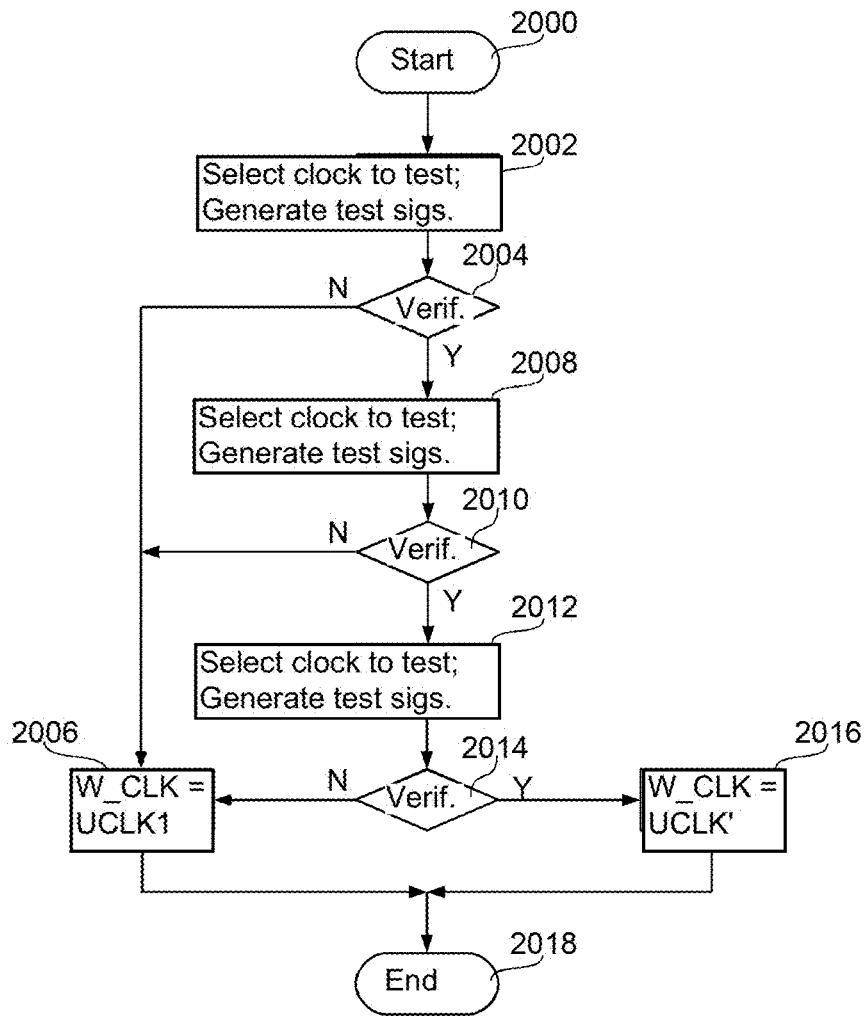
FIG. 11 is a flowchart of a second method that enables calibration of a clock signal.

In general, the approach described previously for calibration of the write clock signal W_CLK could also be applied to the architecture described with reference to a modification of the circuits illustrated in FIG. 1b, i.e., a communication system in which the transmission interface 13 (FIG. 7) comprises a dual-port FIFO memory and the data from the FIFO memory are read with the clock signal CLK_RX of the reception interface 15 (FIG. 7). For instance, in this case, the transmission interface 13 could generate various versions of the clock signal CLK_RX that are phase-shifted with respect to one another (for example, using the circuit shown in FIG. 10) and select a given clock signal, substantially following the procedure described previously. For instance, the transmission interface 13 could select the clock signal RX_CLK or else its delayed version and save given test signals in the FIFO memory. Next, the reception interface 13 could read the data, using in this case the clock signal selected via the transmission interface 13, verify correct reception of the data, and signal the result to the transmission interface 13. Consequently, using for example the procedures shown in FIG. 8 or FIG. 11, also in this case the clock signal that enables a correct transmission of data through the data lines DATA can be selected.

Of course, without prejudice to the principle of the invention, the details of construction and the embodiments may vary widely respect to what has been described and illustrated herein purely by way of example, without thereby departing from the scope of the present disclosure, as defined in the ensuing claims.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A communication system to interface a transmitting circuit with a receiving circuit, comprising:
   a transmission interface configured to receive data from said transmitting circuit and configured to transmit said received data over at least one data line in response to a transmission clock signal;
   a reception interface configured to receive said data transmitted over said at least one data line in response to a reception clock signal and configured to transmit said received data to said receiving circuit, wherein said transmission and reception clock signals have a same frequency; and a clock generation circuit, said clock generation circuit configured to:
generate a plurality of clock signals that have the same frequency, the plurality of clock signals each phase-shifted with respect to one another;
perform, during a calibration phase, a selection operation to select one of said plurality of clock signals for said transmission clock signal or said reception clock signal; and
use, for transmitting data during normal operations, the one of said plurality of clock signals selected during the selection operation, wherein said selection operation includes:
testing different ones of said plurality of clock signals;
transmitting one or more test signals via said transmission interface according to the different ones of the plurality of clock signals; and
verifying whether the one or more test signals received via said reception interface are correct, wherein said communication system is configured to generate at least one first clock signal and one second clock signal that are phase shifted by 180°, and wherein said communication system is configured to verify the transmission of the test signals for at least one of said first clock signal and said second clock signal, wherein said communication system is configured to generate at least one third clock signal and one fourth clock signal, said third clock signal corresponding to said first clock signal plus a time interval and said fourth clock signal corresponding to said first clock signal minus the time interval.

2. The system according to claim 1, wherein said reception interface includes a dual-port first-in first-out (FIFO) memory, and wherein said plurality of clock signals and said transmission clock signal have the same frequency, and wherein the data is written in said FIFO memory in response to said selected at least one of said plurality of clock signals.

3. The system according to claim 1, wherein said transmission interface includes a dual-port first-in first-out (FIFO) memory, and wherein said plurality of clock signals and said reception clock signal have the same frequency, and wherein the data is read from said FIFO memory in response to said selected at least one of said plurality of clock signals.

4. The system according to claim 1, wherein said communication system is configured to verify transmission of the test signals for said first clock signal, said third clock signal, and said fourth clock signal, and said communication system is configured to select said first clock signal if the test signals received via said reception interface for said first clock signal, said third clock signal, and said fourth clock signal are correct, and said communication system is configured to select said second clock signal if at least one of the test signals received via said reception interface for said first clock signal, said third clock signal, and said fourth clock signal contains an error.

5. The system according to claim 1, wherein said test signals consist of a transmission sequence in which a profile of type "0101" or "1010" is transmitted on each data line.

6. A method to interface a transmitting circuit with a receiving circuit, comprising:
generating a plurality of clock signals that have a same frequency, each clock signal of the plurality of clock signals phase-shifted with respect to one another, wherein said plurality of clock signals includes at least one first clock signal and one second clock signal that are phase shifted by 180°, and wherein said plurality of clock signals includes at least one third clock signal and one fourth clock signal, said third clock signal corresponding to said first clock signal plus a time interval and said fourth clock signal corresponding to said first clock signal minus the time interval;
selecting, during a calibration phase, one of said plurality of clock signals for a transmission clock signal or a reception clock signal, wherein said selecting includes:
testing different ones of said plurality of clock signals;
transmitting one or more test signals over at least one data line according to the different ones of said plurality of clock signals; and
verifying whether the one or more test signals received are correct, wherein said verifying includes verifying the transmitting of the one or more test signals for at least one of said first clock signal and said second clock signal; and
passing data during normal operation using the one of said plurality of clock signals selected during said calibration phase, the passing including:
receiving said data from said transmitting circuit and transmitting said received data over said at least one data line in response to the transmission clock signal; and
receiving said data transmitted over said at least one data line in response to the reception clock signal and transmitting said received data to said receiving circuit, wherein said transmission and reception clock signals have the same frequency.

7. The method according to claim 6, comprising:
storing said data from said transmitting circuit in a dual-port first-in first-out (FIFO) memory, the dual-port FIFO memory configured in a transmission interface.

8. The method according to claim 7, wherein receiving said data transmitted over said at least one data line includes synchronously storing said data in a second dual-port first-in first-out (FIFO), the second dual-port FIFO memory configured in a reception interface.

9. The method according to claim 6, wherein said transmission clock signal and said reception clock signal are phase shifted by 180°.

10. The method according to claim 6, comprising:
storing said data from said transmitting circuit in a dual-port first-in first-out (FIFO) memory, the dual-port FIFO memory configured in a transmission interface.

11. The method according to claim 6, wherein passing data during normal operation comprises:
asserting at least one flow control signal.

12. The method according to claim 6, wherein said test signals includes at least a first bit sequence of alternating binary values and a second bit sequence of binary values alternating opposite to the first bit sequence.

13. An integrated circuit, comprising:
a transmitting circuit coupled to a transmission interface;
a receiving circuit coupled to a reception interface;
a bus having at least one data line, the bus communicatively coupling the transmission interface with the reception interface;
a clock generation circuit to generate a plurality of clock signals, the plurality of clock signals include a first clock signal coupled to the transmission interface and a second clock signal coupled to the reception interface, the first and second clock signals having a same frequency and a phase difference of 180°, the clock generation circuit to further generate at least one third clock signal and one fourth clock signal, said third clock signal corresponding to one of said first or second clock signals plus a time interval and said fourth clock signal corresponding to the one of said first or second clock signals minus the time interval; and a test signal generation circuit to test different ones of said plurality of clock signals, said test of different ones of said plurality of clock signals including transmitting one or more test signals over the at least one data line according to the different ones of said plurality of clock signals and verifying whether the one or more test signals received are correct, wherein said verifying includes verifying the transmitting of the one or more test signals for at least one of said first clock signal and said second clock signal.

14. The integrated circuit according to claim 13, wherein the different phase is sufficient to permit a memory in the reception interface to elapse a setup time prior to storing data received from the transmission interface.

15. The integrated circuit according to claim 13, wherein the clock generation circuit comprises:

a control unit, wherein the control unit and the test signal generation circuit cooperate to:
perform, during a calibration phase, a selection operation to select one of a plurality of clock signals to be used after ending the calibration.

16. The integrated circuit according to claim 15, wherein the test signals includes at least a first bit sequence of alternating binary values and a second bit sequence of alternating binary values, the binary values of the first bit sequence opposite to the binary values of the second bit sequence.

17. The integrated circuit according to claim 13, comprising:

a first dual-port first-in first-out (FIFO) memory coupled to the transmission interface and arranged for synchronous operation according to the first clock signal; and a second dual-port FIFO memory coupled to the reception interface and arranged for synchronous operation according to the second clock signal.

18. The integrated circuit according to claim 13, wherein the bus includes at least one flow control signal line.

* * * * *

UNITED STATES PATENT AND TRADEMARK OFFICE
CERTIFICATE OF CORRECTION

PATENT NO. : 9,692,672 B2  
APPLICATION NO. : 14/604439  
DATED : June 27, 2017  
INVENTOR(S) : Daniele Mangano et al.

Page 1 of 1

It is certified that error appears in the above-identified patent and that said Letters Patent is hereby corrected as shown below:

In the Claims

Column 14, Line 6:
"one fourth clock signal, said third dock signal corresponding" should read, --one fourth clock signal, said third clock signal corresponding--.

Signed and Sealed this
Sixteenth Day of January, 2018

Joseph Matal
*Performing the Functions and Duties of the*
*Under Secretary of Commerce for Intellectual Property and*
*Director of the United States Patent and Trademark Office*